No. 738,475. PATENTED SEPT. 8, 1903.
W. W. PALMER.
SCALE.
APPLICATION FILED DEC. 5, 1902.
NO MODEL. 3 SHEETS—SHEET 1.
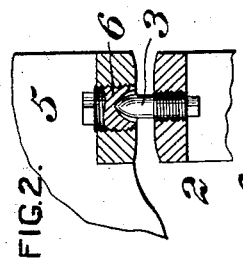
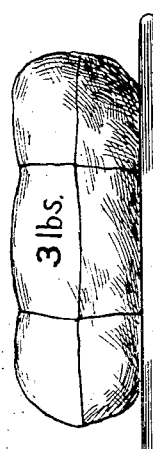
WITNESSES:
James C. Herron.
S. R. Bell.
INVENTOR,
Wm. W. Palmer
by Snowden Bell,
Att'y.

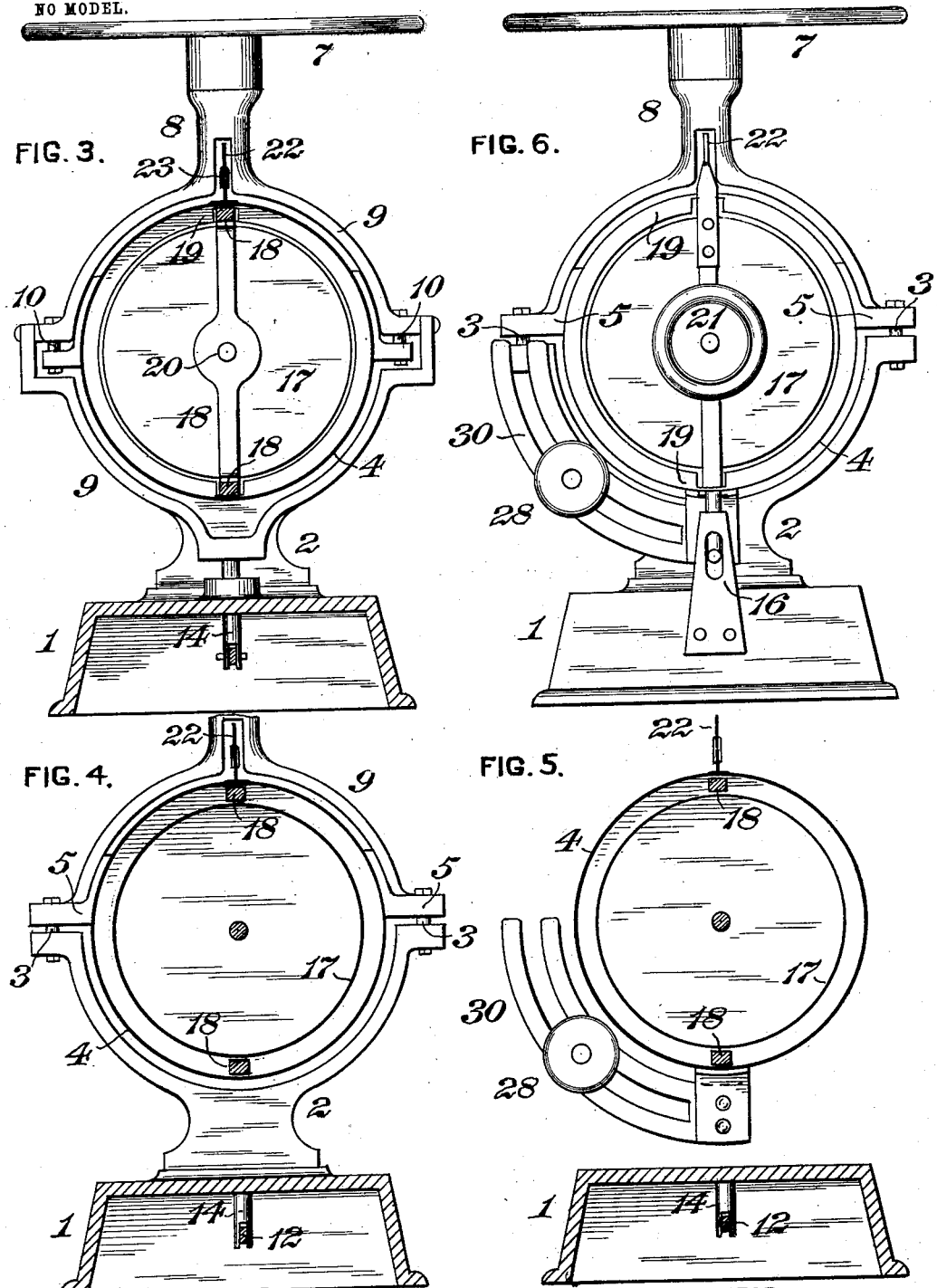

No. 738,475. PATENTED SEPT. 8, 1903.
W. W. PALMER.
SCALE.
APPLICATION FILED DEC. 5, 1902.
NO MODEL. 3 SHEETS—SHEET 3.

WITNESSES: INVENTOR,
James C. Herron. Wm. W. Palmer
S. R. Bell. by Marsden Bell,
Att'y.

No. 738,475.

Patented September 8, 1903.

UNITED STATES PATENT OFFICE.

WILLIAM W. PALMER, OF PITTSBURG, PENNSYLVANIA.

SCALE.

SPECIFICATION forming part of Letters Patent No. 738,475, dated September 8, 1903.

Application filed December 5, 1902. Serial No. 134,061. (No model.)

*To all whom it may concern:*

Be it known that I, WILLIAM W. PALMER, of Pittsburg, in the county of Allegheny and State of Pennsylvania, have invented a certain new and useful Improvement in Scales, of which improvement the following is a specification.

The object of my invention is to provide a weighing-scale of simple and inexpensive construction, which shall have the capacity of ascertaining and indicating the weight of articles, their value upon determined bases of price, and the number of individual articles comprehended in a plurality of articles of equal individual weights.

The improvement claimed is hereinafter fully set forth.

In the accompanying drawings, Figure 1 is a side view, partly in section, of a scale illustrating an embodiment of my invention; Fig. 2, a vertical longitudinal section, on an enlarged scale, through one of the pivot-bearings; Figs. 3, 4, and 5, transverse sections on the lines $a\,a$, $b\,b$, and $c\,c$, respectively, of Fig. 1; Fig. 6, an end view in elevation as seen from the left, and Figs. 7 and 8 transverse sections illustrating modifications of structural detail.

Figure 8:
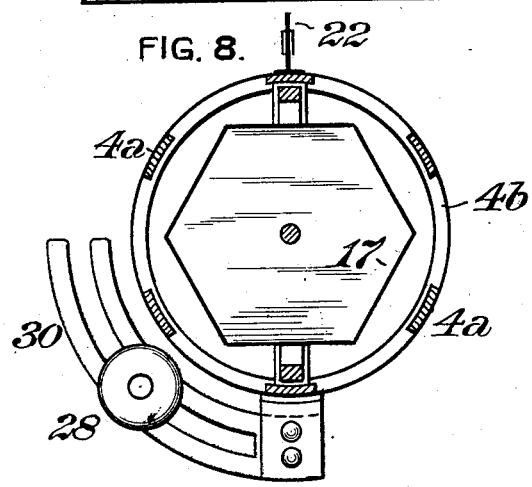

In the practice of my invention I provide a suitable base or bed 1, upon which is fixed a vertical standard or support 2, which is preferably, as shown, in the form of a yoke or fork which carries on the upper ends of its arms the pivots 3 of the scale-beam 4. The beam 4 is in the instance shown in the form of an open-ended cylinder of sheet metal having lugs 5 secured to its sides, in which lugs are fitted the sockets 6 of the pivots 3 of the beam. The bearing-surfaces of the sockets are located in the central vertical and horizontal planes of the beam, and the abutting ends of the pivots are of substantially conical form, the sockets being recessed correspondingly to receive them. While this form is believed by me to be the preferable one, it will be obvious that knife-edge bearings or fulcrums of the ordinary type may, if desired, be substituted in the judgment of the constructor. A cylindrical beam, as herein shown and described, while advantageous in point of simplicity and economy of construction, is not an essential feature of my invention, and, as will appear upon an understanding of the accessories with which the beam is combined, the latter may, if preferred, be made as a skeleton or open frame composed of longitudinal bars $4^a$, connected to end rings $4^b$, as shown in Fig. 8, instead of having its shell or wall extended continuously around its axial line.

Figure 7:
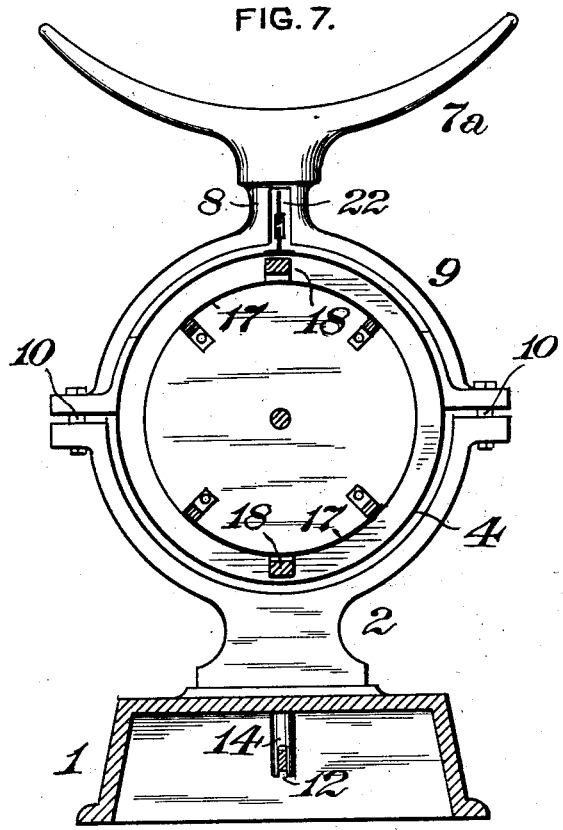

A platform 7, or in lieu thereof forks $7^a$, to support an ordinary scale-pan, as shown in Fig. 7, is fixed upon a standard 8, projecting from the upper section of a two-part or divided ring or carrier 9, which surrounds the beam 4 without being in contact therewith at such a distance from the transverse plane of the beam-pivots 3 as may be proper to enable it to be supported on what may be termed the "short arm" of the beam 4. The pivots 10 of the carrier, which, similarly to those of the beam, are preferably of conical form, are fixed in projections on the side lugs 5 of the beam, and the carrier and connected platform are supported on the pivots 10, through sockets 11, fitted in the upper section of the carrier and bearing on the upper ends of the pivots. The horizontality of the platform is maintained during its movements on its pivots by a check-rod 12, located beneath the cap-plate of the base 1, one end of said rod being coupled to a pin 13, fixed to the base, and the other end being coupled to a rod 14, fixed to the lower section of the carrier. The degree of traverse of the beam 4 on its pivotal bearings is limited, as required, by an arm 15, having a lower horizontal extension, which works in a vertical slot formed in a standard 16, secured to the base 1.

The ascertainment and indication of the weight and value of the load placed upon the platform 7 are effected by an adjustable counterbalance 17 of cylindrical form, which is mounted rotatably in a frame 18, fitted to slide longitudinally in the beam 4 in guides or ways 19, fixed to the inside thereof. The counterbalance is provided with end journals 20, which are fitted to rotate in the vertical bars of the frame 18, and one of said journals is prolonged and carries a hand-wheel 21, by which the counterbalance may be rotated. A weight-indicating bar 22, which is regularly spaced and marked with divisions and numerals showing weights, as pounds and ounces or fractions of ounces, is fixed to one end of the frame 18 of the counterbalance and extends horizontally above the beam, its free end traversing between guides or ways 23, fixed to the latter, and an index 24, fixed to the beam, projects therefrom to a level adjacent to that of the numerals of the indicating-bar, the position of which relatively to the index indicates the weight of the load on the platform 7.

A value-chart 25—that is, a plurality of parallel lines each spaced and marked with divisions and numerals showing values in any determined currency, as cents or dollars and cents—is fixed on the periphery of the counterbalance, the lines of the chart extending longitudinally thereon and the chart being formed either directly on the counterbalance, as by being engraved or otherwise marked thereon, or on a separate strip of metal, paper, or other suitable material secured to the counterbalance. Each line of the chart is marked at one end with a numeral designating the basis of computation of value—i. e., the price per ounce or pound—these numerals being disposed one above another peripherally on the counterbalance, and the relative lengths of the spaces of the several lines are in inverse ratio to the basis of value—that is to say, the counterbalance must be moved outwardly, or to the right, a longer distance to indicate any determined value—as, say, fifteen cents on the chart-line whose basis is five cents than to indicate the same value on a chart-line whose basis is six cents or more. A opening 26 is formed in the periphery of the beam 4 adjacent to its outer or right-hand end, through which a portion of any desired line of the chart may be observed, and the indication of value is given by the coincidence of one of the divisions of said line—as, say, that numbered "15"—with an index 27, fixed to the periphery of the beam and projecting over the opening 26 therein.

The advantages of the counterbalance above described will be readily apparent to those skilled in the art to which my invention relates. Among these may be stated that it is more compact and rigid and more advantageously located than the ordinary long projecting arm and its loose swinging counterbalance. It is easily set and adjusted for price and value by its capacity of longitudinal and rotary movements, and being connected and traversing with the weight-indicating bar both weight and value indications are given without further adjustments.

It will be obvious that, if preferred, the counterbalance may be made of polygonal section, as shown in Fig. 8, instead of being cylindrical, as above described, and also that irrespective of its form in transverse section, its shell or wall need not extend continuously around its axis, but may consists of one or more segments, as shown in Fig. 7, inasmuch as there will only be sufficient space required on the periphery of the shell to admit of the location of the value-chart thereon, and the lines thereof may be so few in number for certain classes of service as not to occupy more than a comparatively small segment of the periphery of the shell.

In order to bring the beam 4 to a condition of stable equilibrium, as may from time to time be required, I provide a balance-ball 28, which is adjustable both longitudinally and vertically relatively to the beam. The balance-ball 28 is internally threaded and engages an adjusting-screw 29, on which it may be moved longitudinally toward and from the pivot-bearings of the beam, and the adjusting-screw 29 fits in a segmental slot formed in a curved arm 30, secured to the bottom of the beam, the slot being concentric with the axis thereof. The adjusting-screw and connected balance-ball may be raised and lowered in the slot of the arm 30 and secured in adjusted position by nuts 31 32, working on the adjusting-screw and abutting against the opposite sides of the arm 30.

In the operation of the scale the article or material to be weighed is placed upon the platform 7, and the counterbalance 17 is rotated by the hand-wheel 21 until the chart-line of the determined standard of value of the article or material—as, say, five cents per pound—is brought to the level of the index 27. The counterbalance is then drawn outwardly, or to the right, until the load on the platform is exactly balanced, when the index 24 will indicate the weight upon the weight-indicating bar 22—as, say, three pounds—and the index 27 will indicate the value on the value-chart 25—as, say, fifteen cents. If a quantity or load equivalent to any determined value is required to be weighed out, the counterbalance is rotated and drawn out until the indicator 27 points to the determined value, and the platform is loaded until the beam stands in balance.

My invention provides, as above shown, a mechanism which may be employed as a weighing and value-computing scale complete in itself, by means of which the time spent in calculating the value of a load may be saved and the incident liability to error avoided. The construction is simple, inexpensive, and free from tendency to breakage or derangement of its parts or error in the indications which it gives in service.

I claim as my invention and desire to secure by Letters Patent—

1. The combination in a scale, of a support, a scale-beam pivotally mounted thereon, a frame movable longitudinally on the scale-beam, a counterbalance with a price-scale thereon carried by the frame and rotatable around a horizontal axis.

2. The combination, in a scale, of a support, a scale-beam pivotally mounted thereon, a frame movable longitudinally on the scale-beam, a counterbalance mounted rotatably on the frame, a weight-indicating bar fixed to the frame, and an index fixed to the scale-beam in position to give readings on said bar.

3. The combination, in a scale, of a support, a scale-beam pivotally mounted thereon, a frame movable longitudinally on the scale-beam, a counterbalance carried by the frame, a value-chart fixed on the periphery of the rotatable counterbalance, and an index fixed to the scale-beam in position to give readings on said chart.

4. The combination in a scale, of a support, a scale-beam pivotally mounted thereon, a frame movable longitudinally on the scale-beam, a counterbalance with a price-scale thereon carried by the frame and rotatable around a horizontal axis, a load-carrying platform, and connections for effecting the coincident movement of the platform and scale-beam.

5. The combination, in a scale, of a support, a scale-beam pivotally mounted thereon, an arm fixed to said beam and having a slot curved in a plane transverse thereto, an adjusting-screw passing through said slot, nuts engaging said screw on opposite sides of the arm, and a longitudinally-movable balance-ball having an internal thread engaging said screw.

6. The combination, in a scale, of a support, a hollow scale-beam substantially cylindrical in cross-section, and pivotally mounted on the support, longitudinal guides or ways on the interior of the scale-beam, a frame fitted to traverse on said guides, a counterbalance journaled to rotate in said frame, a weight-indicating bar fixed to the frame, and an index fixed to the scale-beam in position to give readings on said bar.

7. The combination, in a scale, of a support, a hollow scale-beam substantially cylindrical in cross-section, and pivotally mounted on the support, longitudinal guides or ways, on the interior of the scale-beam, a frame fitted to traverse on said guides, a counterbalance journaled to rotate in said frame, a value-chart fixed on the periphery of the counterbalance, and an index fixed to the scale-beam in position to give readings on said chart.

WILLIAM W. PALMER.

Witnesses:
J. SNOWDEN BELL,
CLARENCE A. WILLIAMS.